(12) United States Patent
Melendez et al.

(10) Patent No.: US 11,234,468 B2
(45) Date of Patent: Feb. 1, 2022

(54) SHAPING GARMENT WITH FIT-ADJUSTABLE BRASSIERE PORTION

(71) Applicant: Spanx, Inc., Atlanta, GA (US)

(72) Inventors: Angelica Melendez, Atlanta, GA (US); Jennifer Johnson, Atlanta, GA (US); Elena Novosiolova, Atlanta, GA (US)

(73) Assignee: Spanx, Inc., Atlanta, GA (US)

( * ) Notice: Subject to any disclaimer, the term of this patent is extended or adjusted under 35 U.S.C. 154(b) by 0 days.

(21) Appl. No.: 15/965,019

(22) Filed: Apr. 27, 2018

(65) Prior Publication Data

US 2018/0310641 A1   Nov. 1, 2018

Related U.S. Application Data

(60) Provisional application No. 62/492,464, filed on May 1, 2017.

(51) Int. Cl.

| | |
|---|---|
| *A41C 3/08* | (2006.01) |
| *A41C 3/00* | (2006.01) |
| *A41B 9/16* | (2006.01) |
| *B32B 1/00* | (2006.01) |
| *B32B 5/02* | (2006.01) |
| *B32B 5/26* | (2006.01) |
| *A41B 9/08* | (2006.01) |
| *A41F 1/00* | (2006.01) |

(Continued)

(52) U.S. Cl.
CPC ............. *A41C 3/0028* (2013.01); *A41B 9/08* (2013.01); *A41B 9/16* (2013.01); *A41C 1/06* (2013.01); *A41C 3/0007* (2013.01); *A41C 3/08* (2013.01); *A41F 1/006* (2013.01); *B32B 1/00* (2013.01); *B32B 5/026* (2013.01); *B32B 5/26* (2013.01); *A41C 1/003* (2013.01); *A41C 1/02* (2013.01); *A41C 5/00* (2013.01); *B32B 2307/54* (2013.01); *B32B 2437/00* (2013.01)

(58) Field of Classification Search
CPC ........... A41C 3/0028; A41C 3/06; A41C 9/08; A41C 1/006; A41B 9/08
USPC ...................................................... 450/31, 32
See application file for complete search history.

(56) References Cited

U.S. PATENT DOCUMENTS 3,173,421 A * 3/1965 Steiner ..................... A41C 3/00
450/61
3,411,509 A * 11/1968 Sachs ....................... A41C 3/00
450/70

(Continued)

*Primary Examiner* — Timothy K Trieu
(74) *Attorney, Agent, or Firm* — Meunier Carlin & Curfman LLC

(57) ABSTRACT

Designing garments that include brassiere cups can be challenging due to the natural fluctuation of a woman's breast size, as well as a possible disconnect between the size of her breasts and the size of the rest of her body. The high range of size variability places pressure on stores to stock inventories that include great ranges of sizes. This places an inventory risk to the store, since rarer sizes may never sell. The disclosed garment addresses these issues by including a fit-adjustable brassiere portion. The cups of the fit-adjustable brassiere portion include fit-modifying panels that increase their flexibility and elasticity. The rear side of the fit-adjustable brassiere portion includes a back adjuster with highly elastic regions that enables the brassiere portion to fit a broader range of chest sizes. Each of these features give the garment a more universal fit and enable stores to carry fewer sizes.

25 Claims, 13 Drawing Sheets

(51) Int. Cl.
*A41C 1/06* (2006.01)
*A41C 5/00* (2006.01)
*A41C 1/02* (2006.01)
*A41C 1/00* (2006.01)

(56) References Cited

U.S. PATENT DOCUMENTS

| | | | | |
|---|---|---|---|---|
| 6,811,462 B1* | 11/2004 | Kenneally | ............... | A41C 3/08 |
| | | | | 2/67 |
| 2008/0134406 A1* | 6/2008 | Shih | ............... | A41C 1/02 |
| | | | | 2/78.1 |
| 2010/0184355 A1* | 7/2010 | Kennedy | ............... | D04B 1/246 |
| | | | | 450/31 |
| 2014/0357159 A1* | 12/2014 | Balland | ............... | A41C 3/0028 |
| | | | | 450/80 |
| 2015/0147939 A1* | 5/2015 | Chen | ............... | A41B 9/06 |
| | | | | 450/31 |

* cited by examiner

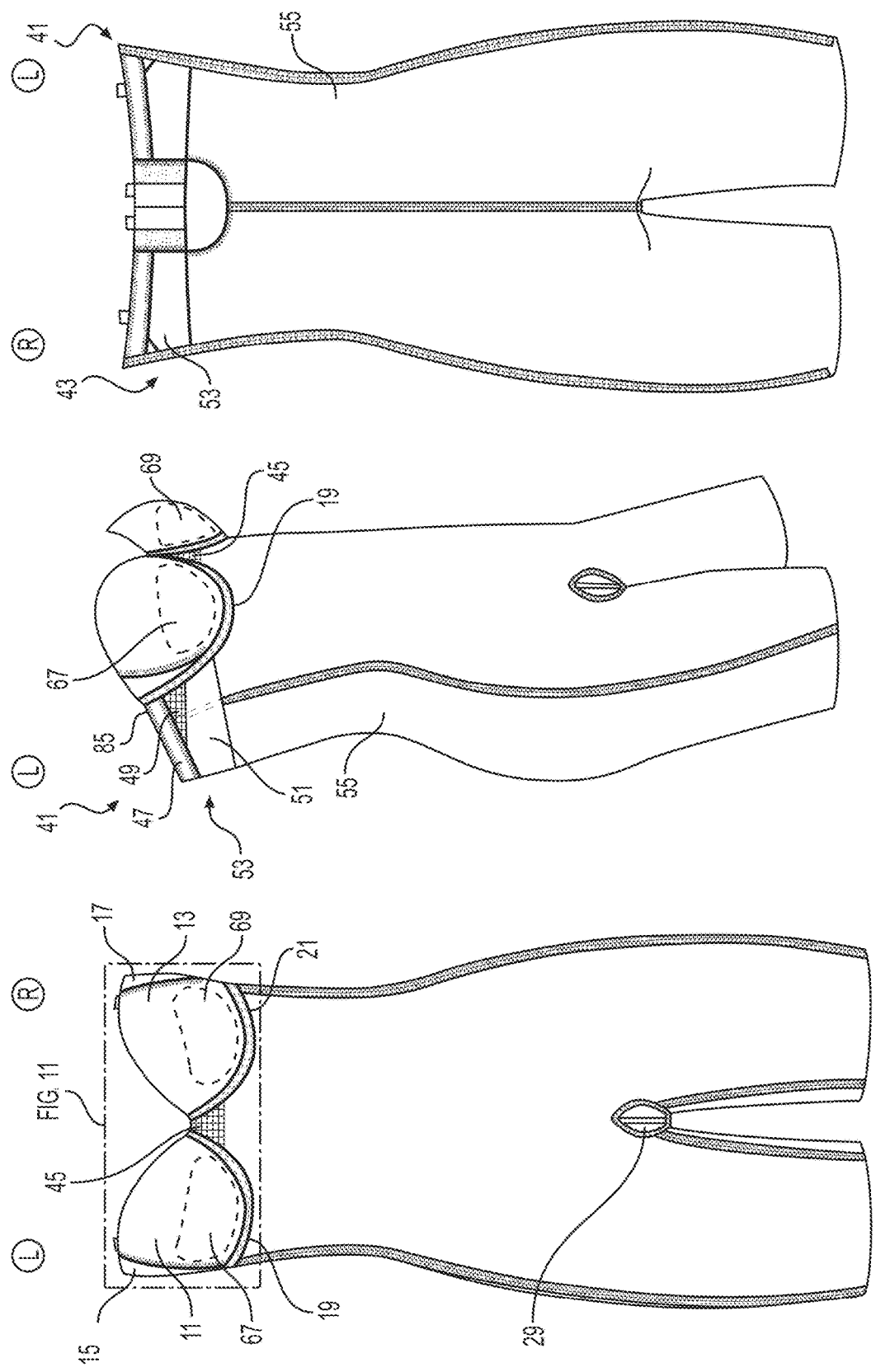

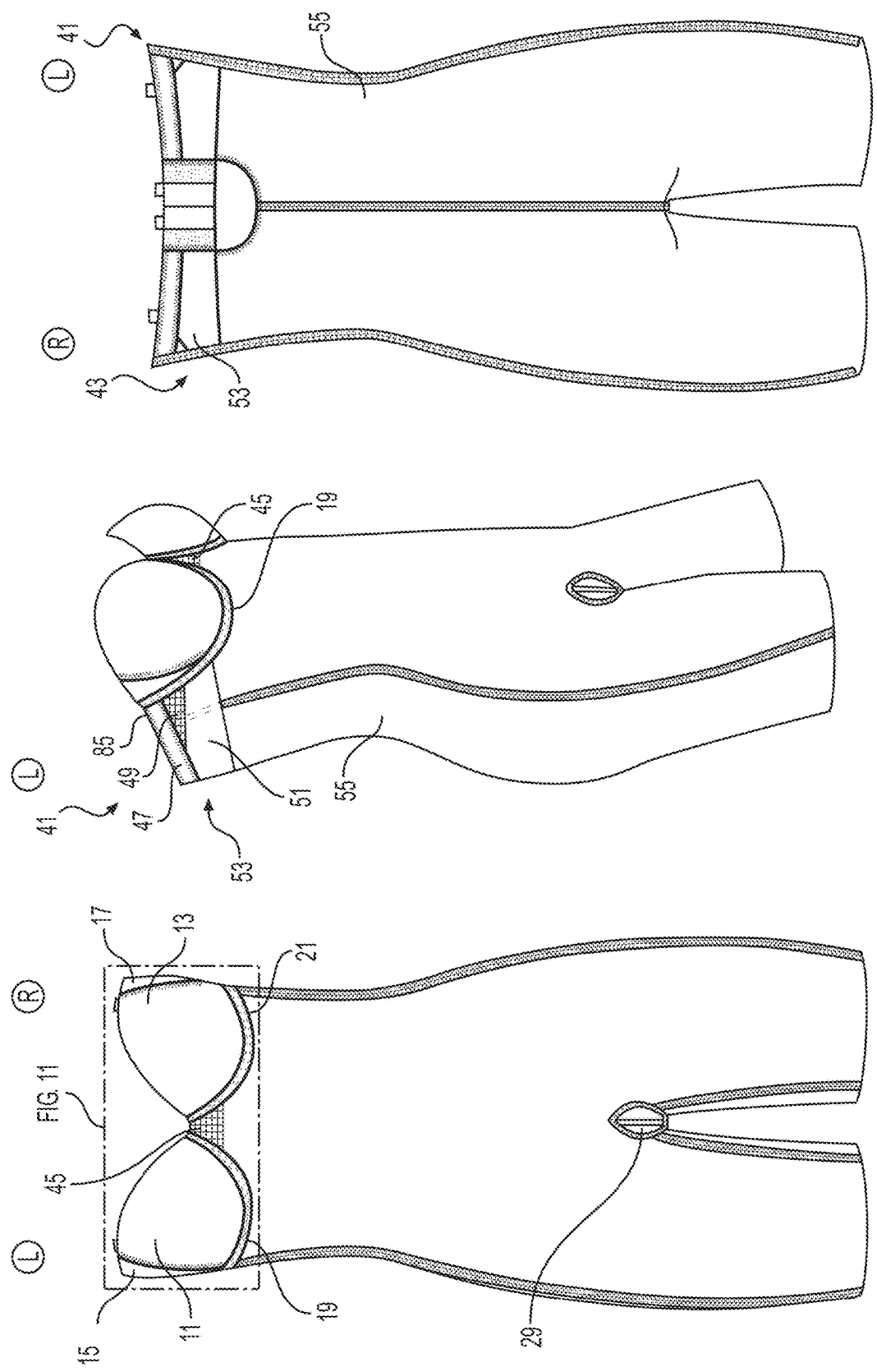

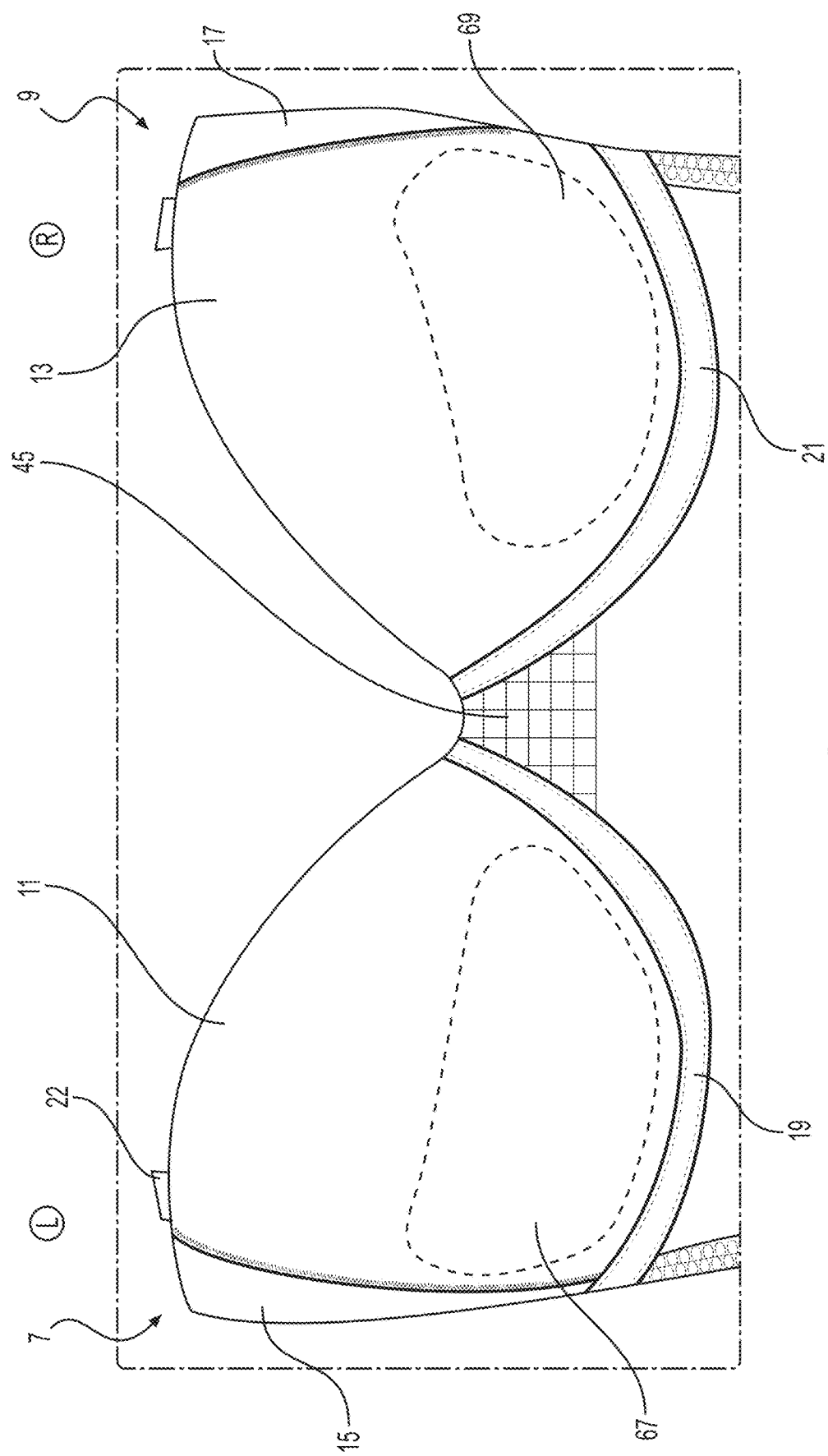

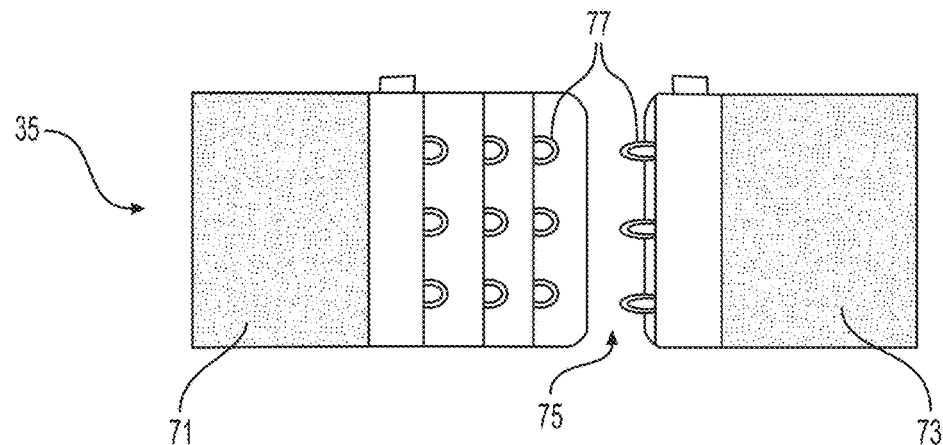
FIG. 13
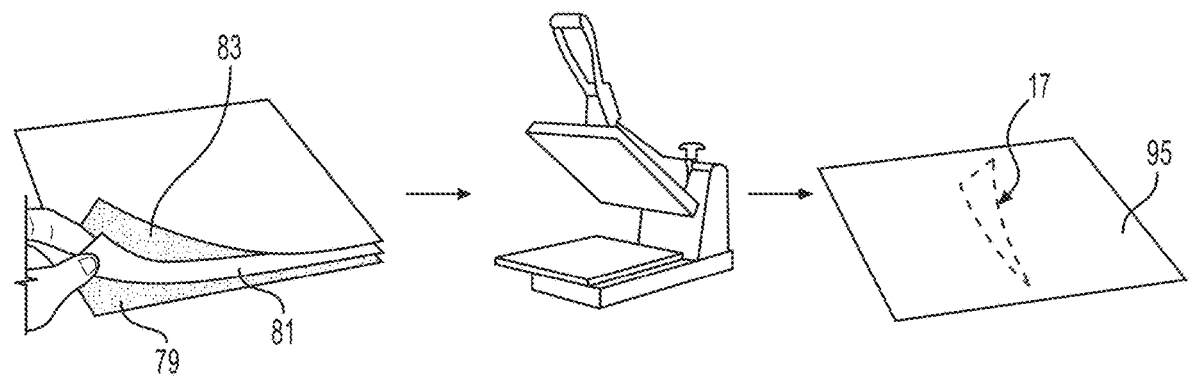
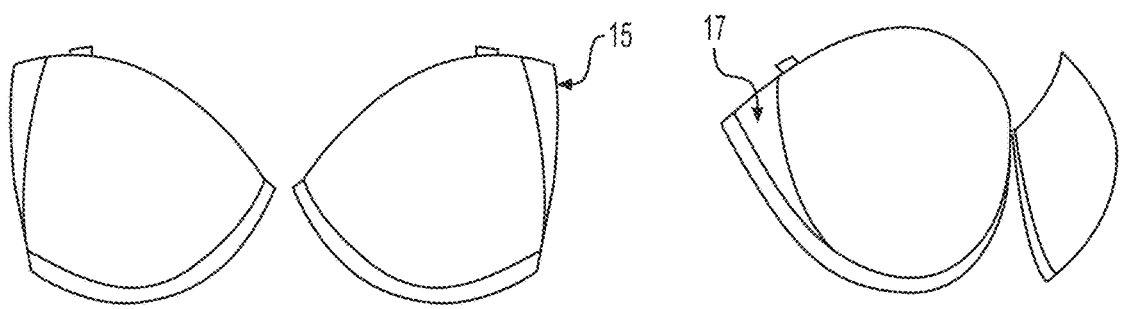
FIG. 14

SHAPING GARMENT WITH FIT-ADJUSTABLE BRASSIERE PORTION

CROSS-REFERENCE TO RELATED APPLICATIONS

This application claims the benefit of U.S. Provisional Application 62/492,464, filed May 1, 2017, which is incorporated by reference in its entirety for all purposes.

BACKGROUND

Special occasions often lead to the purchase of unique apparel that may only be used once or a few times. These garments can have interesting necklines, back lines, breast padding, and long, embellished skirts and underskirts that add weight. Shaping garments can be worn under the special occasion garment to smoothen and shape the wearer's overall silhouette. Designing shaping garments for special occasions can be especially challenging because they must be versatile enough to adapt to the many types of unique features that special occasion apparel can include.

SUMMARY

Brassieres and other breast supporting garments are typically constructed to fit a somewhat narrow range of breast sizes. However, one woman's breast size can fluctuate, for example, with pregnancy, nursing, weight gain or loss, or hormonal changes. Women often purchase breast supporting garments in multiple sizes to accommodate these fluctuations. Furthermore, designing breast supporting garments is a challenge due to the possible disconnect between breast size and the size of other body parts. The high range of size variability places pressure on stores to stock inventories that include great ranges of sizes. This places an inventory risk to the store, since rarer sizes may never sell. These issues pose challenges when designing brassieres or shapewear to suit the unique features of special occasion apparel. The disclosed breast supporting garment addresses these issues by including a fit-adjustable brassiere portion. The cups of the fit-adjustable brassiere portion include fit-modifying portions that increase their flexibility and elasticity. The rear side of the fit-adjustable brassiere portion includes a back adjuster with highly elastic regions that enables the brassiere portion to fit a broader range of chest sizes. Each of these features give the garment a more universal fit and enable stores to carry fewer sizes.

Some embodiments of the garments disclosed herein include a front side and a rear side, a left cup on the front side configured to support a left breast, and a right cup on the front side configured to support a right breast. The left and right cups each include a main region and a fit-modifying region that is fixedly or seamlessly attached to the main region. The fit-modifying regions are positioned laterally with respect to the main regions. The left and right fit-modifying regions each have a lower elastic modulus than the left and right main regions. The garments also include a torso-encircling portion that extends away from the left and right cups toward the rear side of the garment, at least partially defining a torso space.

The left and right fit-modifying portions can, in some embodiments, have tapered shapes. In some embodiments, the left and right fit-modifying regions narrow as they extend downward toward a bottom edge of their respective cup. The fit-modifying regions can be elongated in an inferior to superior direction. In some embodiments, the fit-modifying regions can extend inferiorly from a superior edge of the cup. They can be fixedly or seamlessly attached to the main region of the cup. Fixedly attached can be, for example, attached by bonding or by a sewn seam. In some embodiments, the fit-modifying regions can have a smaller surface area than the main regions. In some embodiments, the left and right fit-modifying regions can each include inner layer, an outer layer, and at least one layer of adhesive between the inner and outer layers. The inner layer can, in some embodiments, be the same material as the outer layer. In some embodiments, each of the left and right fit-modifying regions includes a central layer positioned between the inner and outer layers. The central layer can have a lower elastic modulus than the inner or outer layers. The central layer can be formed of at least 80% elastane. A first layer of adhesive can be positioned between the inner layer and the central layer, and a second layer of adhesive can be positioned between the central layer and the outer layer.

The garment can be constructed as shapewear, a brassiere, or a bustier. For example, the torso encircling portion can, in some embodiments, have a height that is less than the height of the left cup or the right cup. In other embodiments, the torso-encircling portion can extend downward and away from the left and right cups to form an abdominal shaping region on the front side of the garment and a back shaping region on the rear side of the garment. In some embodiments, a lower region of the front side of the garment includes a crotch portion and a lower region on the rear side comprises a buttock shaping portion. The garment can also define right and left leg spaces, or, in some embodiments, left and right pant legs.

The torso-encircling portion can include an outer component and an inner component that is attached to the outer component along a superior edge of the garment. In some embodiments, an inferior area of the inner component is unattached to the outer component. The inner component can be shorter in the longitudinal direction than the outer component, and at least a portion of the inner component can have a higher elastic modulus than the outer component. The inner component can be thicker than the outer component in a direction perpendicular to a longitudinal axis extending through the torso space in superior to inferior direction.

In some embodiments, the left and right cups include underwires that are attached to the inner component of the torso-encircling portion. A stabilizing panel can be used to connect the left underwire to the right underwire at an upper, central region of the front side of the garment. The outer component of the torso-encircling portion can attach to the left and right underwires over the inner component and the stabilizing panel.

In some embodiments, the torso-encircling portion connects the left and right cups to a back adjuster positioned on the rear side of the garment. The back adjuster has a lower elastic modulus than at least the superior region of the torso-encircling portion. The back adjuster can include at least one closure mechanism and at least one highly elastic region. In some embodiments, the closure mechanism is located between left and right highly elastic regions. For example, the right lateral edge of the left highly elastic region can be attached to the left side of a closure mechanism, and the left lateral edge of the left highly elastic region can be attached to a portion of a garment having a higher elastic modulus than the left highly elastic region, and the left lateral edge of the right highly elastic region can be attached to the right side of the closure mechanism, and the right lateral edge of the right highly elastic region is attached to a portion of the garment having a higher elastic modulus than the right highly elastic region. In some embodiments, the closure mechanism comprises at least one hook and eye. The eyes can be positioned on an outer side of the back adjuster and the hooks can curve toward an inner side of the back adjuster. In some embodiments, the superior edge of the back shaping region extends downward to define lateral edges of a space in an upper, central area of the back shaping region. The back adjuster can bridge the lateral edges of this space, and can define the superior edge of the space.

Methods of making the garments are also disclosed herein. In some embodiments, the method includes attaching a left lateral edge of a left main panel to a left fit-modifying panel that has a lower elastic modulus than the left main panel, and attaching the left main panel and the left fit-modifying panel to a left underwire to form a left cup. The method also includes attaching a right lateral edge of a right main panel to a right fit-modifying panel having a lower elastic modulus than the right main panel, and attaching the right main panel and the right fit-modifying panel to a right underwire to form a right cup. In some embodiments, the left and right main panels are attached to the left and right fit-modifying panels using a zig zag stitch and a coverstitch. The method further includes attaching the right cup to the left cup.

In some embodiments, a fit-modifying panel is constructed by positioning an adhesive layer between a first fabric layer and a second fabric layer, melting the adhesive layer between the first and second fabric layers to form a fit-modifying fabric, and cutting the fit-modifying fabric to form a left fit-modifying panel and a right fit-modifying panel. In some embodiments, a third fabric layer is positioned between the first and second fabric layers. The third fabric layer can be constructed of at least 80% elastane. The methods can further include positioning the first adhesive layer between the first and third fabric layers, positioning a second adhesive layer between the second and third fabric layers, melting the first and second adhesive layers between the first, second and third fabric layers to form the fit-modifying fabric, and cutting the fit-modifying fabric to form the left fit-modifying panel and the right fit-modifying panel. In some methods, pressure is applied while melting the adhesive layers.

The methods of making the garments can also include attaching the right cup to a torso-encircling portion, attaching the left cup to the torso-encircling portion, and attaching the torso-encircling portion to a back adjuster. At least a portion of the back adjuster has a lower elastic modulus than at least the superior region of the torso-encircling portion. The method can include attaching a right wing of the torso-encircling portion to a right highly elastic region of the back adjuster, attaching a left wing of the torso-encircling portion to a left highly elastic region of the back adjuster, attaching either the right or left highly elastic region to an eye panel such that the eyes are positioned on the outer side of the back adjuster, and attaching the other of the right or left highly elastic region to a hook panel such that the hooks curve toward an inner side of the back adjuster.

DESCRIPTION OF THE DRAWINGS

FIG. 4A illustrates a front view of the inside of a garment having brassiere pads.
FIG. 4B illustrates a front view of the inside of a garment without brassiere pads.
FIG. 5A illustrates a left side view of the inside of a garment having brassiere pads.
FIG. 5B illustrates a left side view of the inside of a garment without brassiere pads.
FIG. 6A illustrates a rear view of the inside of a garment having brassiere pads.
FIG. 6B illustrates a rear view of the inside of a garment without brassiere pads.
FIG. 11A illustrates an interior view of a brassiere portion with brassiere pads.
FIG. 13 illustrates a back adjuster.
FIG. 14 illustrates method steps for making a fit-modifying panel (top row). The bottom row illustrates front (left) and side (right) views of finished brassiere cups including fit-modifying panels.

DETAILED DESCRIPTION

Designing breast supporting garments can be challenging due to the natural fluctuation of a woman's breast size over time. Designing breast supporting shapewear can be especially challenging due to variability between cup size, band size, and body size. The high range of size variability places pressure on stores to stock inventories that include great ranges of sizes, even if they are rare. This places an inventory risk to the store, since some of these sizes may never sell.

The disclosed garment addresses these issues by including a fit-adjustable brassiere portion. The cups of the fit-adjustable brassiere portion include fit-modifying panels that increase their flexibility and elasticity. The rear side of the fit-adjustable brassiere portion includes a back adjuster with highly elastic regions that enables the brassiere portion to fit a broader range of chest sizes. Each of these features give the garment a more universal fit and enables stores to carry fewer sizes.

This description refers to certain aspects of the garment relative to other aspects of the garment or to the body of a wearer. As used herein, superior indicates a direction that is closer to the wearer's head. Inferior indicates a direction that is closer to the wearer's feet. Upward, upper, or uppermost indicates a superior direction, or toward a wearer's head. Downward, lower, or lowermost indicates an inferior direction, or toward a wearer's feet. The longitudinal direction refers to an axis extending between the superior and inferior edges of the garment, or between the wearer's head and feet. Lateral indicates a positioning that is closer to the sides of the wearer. Medial indicates a positioning that is farther from the sides of the wearer. The terms right and left are in reference to the wearer's body. Some of the figures include the letters R and L as right and left directional indicators.

Figure 3:
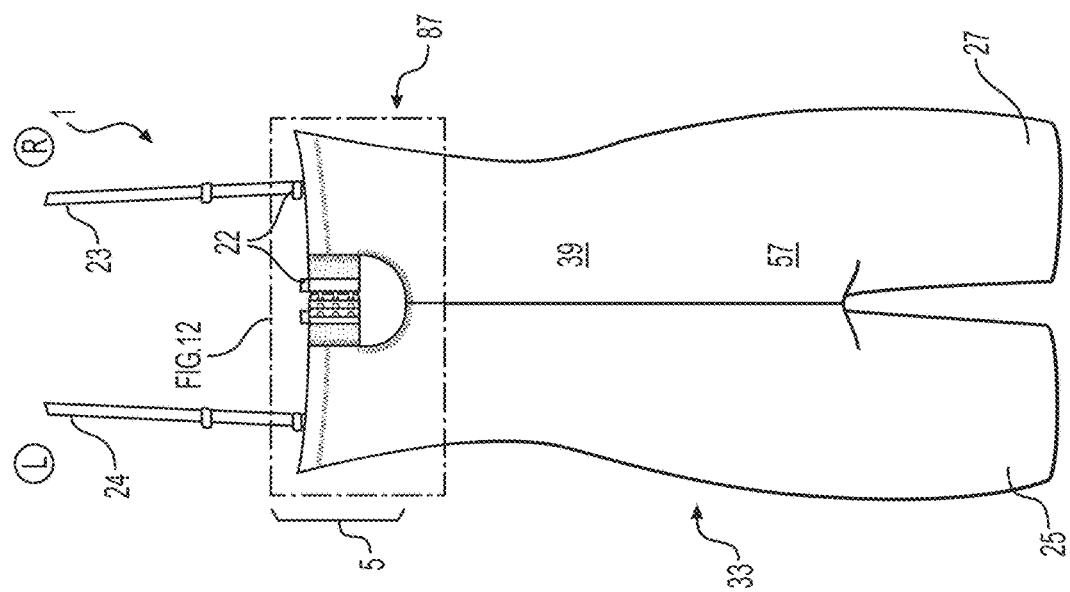
FIG. 3 illustrates a rear view of the outside of a garment.
Figure 2:
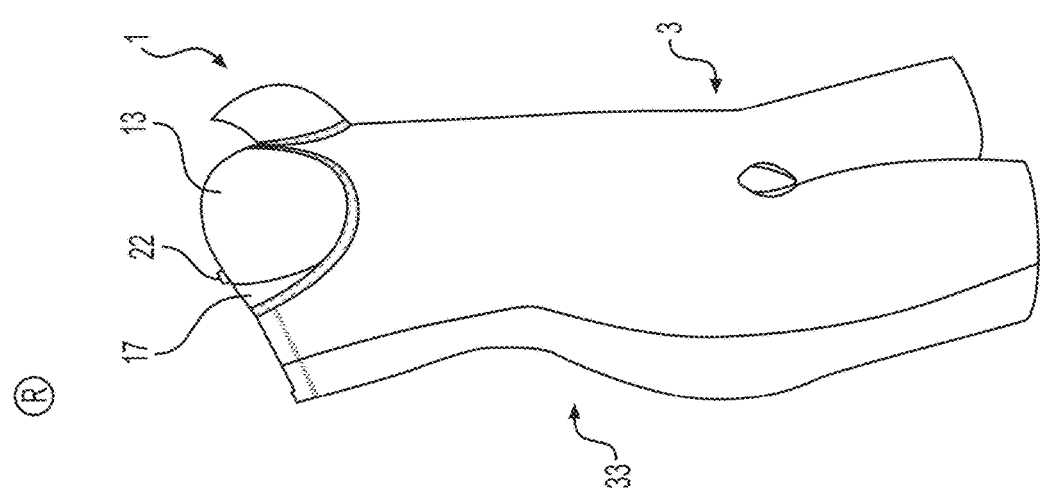
FIG. 2 illustrates a right side view of the outside of a garment.
Figure 1:
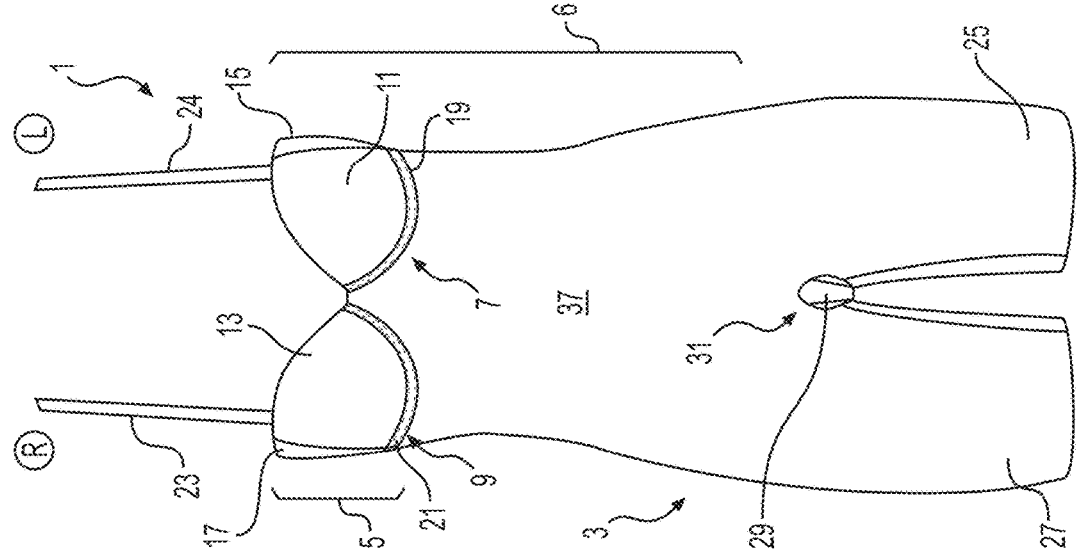
FIG. 1 illustrates a front view of the outside of a garment.

FIGS. 1-3 show exterior views of the garment 1. FIG. 1. shows the front side 3 of a particular embodiment. The garment 1 is shown as a bodysuit with pant legs, but in other embodiments the garment 1 could be a pantless bodysuit, a bustier, or a brassiere alone. The garment 1 includes a fit-adjustable brassiere portion 5. The fit-adjustable brassiere portion 5 includes a left cup 7 and a right cup 9. Each cup includes left and right main panels 11, 13, left and right fit-modifying panels 15, 17, and left and right underwires 19, 21.

A torso-encircling portion 6 includes the fit-adjustable brassiere portion 5 and extends away from the left and right cups 7, 9 and toward the rear side 33 of the garment 1 to at least partially define a torso space. The torso-encircling portion 6 of the illustrated embodiment includes an abdominal shaping region 37, a back shaping region 39, a crotch portion 31, and a buttock shaping portion 57 (shown in FIG. 3). The garment 1 can include left and right pant legs 25, 27, as shown in FIG. 1. In some embodiments, the pant legs can be raw cut or free cut so as to reduce visibility and increase comfort. In some embodiments, such as when the garment 1 is a brassiere alone, the torso-encircling portion 6 can be shorter in the longitudinal direction than the height of the cups 7, 9. Other embodiments, such as when the garment 1 is a bustier, can include a torso-encircling portion 6 that includes the brassiere portion 5, the abdominal shaping region 37, and the back shaping region 39, without the crotch portion 31, buttock shaping portions 57, and left and right pant legs 25, 27.

In some embodiments, the garment can include a specialized construction, or gusset 29, in the crotch portion 31. The gusset 29 can enable the wearer to use the bathroom without removing garment 1. Specialized gussets 29 are described elsewhere, such as in U.S. Patent Application No. 62/491, 756 and Ser. No. 15/964,516, which are incorporated by reference in their entireties. For example, the gusset can include an access space, or a void in the garment 1, that enables the wearer to use the restroom without removing the garment 1. In some embodiments, the access space can be partially covered by two side cover panels that extend from the right and left leg portions inward to partially or completely cover the access space. The side cover panels can be formed seamlessly with other parts of the garment 1, or they can be fixedly attached, for example, by sewing or bonding. In some embodiments, the gusset can include a highly stretchable panel of material that extends from the front of the garment to the back, over the access space, in the crotch region 31. The highly stretchable panel of material may be included with or without the side cover panels. It can be formed seamlessly with other parts of the garment 1, or may be fixedly attached, for example, by sewing or bonding. The highly stretchable panel of material has a high degree of elongation and recovery, such that it can be moved with just one hand and easily put back into place when finished.

FIG. 3 shows the exterior of the rear side 33 of garment 1, and FIG. 2 shows a right side exterior view of the garment 1. The brassiere portion 5 includes a back adjuster 35, shown in the dotted circled region. Portions of the back adjuster 35 have a lower elastic modulus (greater stretch) than at least the superior region 87 of the torso-encircling portion 6, and will be described in greater detail when discussing FIGS. 12 and 13, below.

FIGS. 4A-6A show interior views of the front, side, and rear of garment 1, respectively. The garment is illustrated as if it is inside out. The circled region of FIG. 4A shows the stabilizing panel 45 that extends between the left underwire 19 and the right underwire 21 of the fit adjustable brassiere portion 5. The stabilizing panel 45 is described in greater detail when discussing FIG. 11, below. The brassiere portion 5 includes a left wing 41 and a right wing 43, as shown in FIGS. 5A and 6A. The seams of the interior, such as the side seams, inseams, and the back seam, can be overlock seams in some embodiments. Seams along the underwire can be continuous top stitches. Certain embodiments of the garment can include brassiere pads 67, 69 as shown in FIGS. 4A-6A. Other embodiments of the garment can be constructed without brassiere pads as shown in FIGS. 4B, 5B, and 6B.

FIG. 5A shows the interior view of the left side of the garment. From the interior view, it is possible to see the details of left wing 41 of the brassiere portion 5. The left (and right) wings 41, 43 include a superior area 47, a middle area 49, and an inferior area 51. A left wing is shown in greater detail in FIG. 15. FIG. 6A shows the interior view of the rear side 33 of the garment. From the interior views, it is clear that the torso-encircling portion 6 has both an inner component 53 and an outer component 55. In the embodiment shown, the inner component 53 comprises the brassiere wings 41, 43. The inner component 53 and outer component 55 are attached to each other to form the superior edge 85 of the garment 1, as shown in FIG. 5A. However, the inferior area 51 of the inner component 53 can remain unattached to the outer component 55 to give the garment 1 a seamless look from the outside.

Both the inner and outer components 53, 55 are attached to the left and right underwires 19, 21 of the brassiere portion 5. In the embodiment shown, the middle and inferior areas 49, 51 of the inner component 53 start at the brassiere cup and continue to the back adjuster 35 without being stitched into a side seam of the garment 1. The inner component 53 is shorter than the outer component 55 in the longitudinal direction, and is not visible from the outside of the garment. The inner component 53 can also be thicker than outer component 55 (in a direction perpendicular to a longitudinal axis extending through the torso space of the garment). At least the superior area 47 of the inner component 53 is stiffer, being formed of a material having a higher elastic modulus than the outer component 55, which aids in keeping the garment 1 from sliding down the torso of the wearer. In some embodiments, a high friction coating, such as a silicone bead, may be applied to a portion of the inner component to prevent sliding. For example, a silicone strip can be applied along the interior surface of the superior area 47 of the inner component 53.

Figure 16:
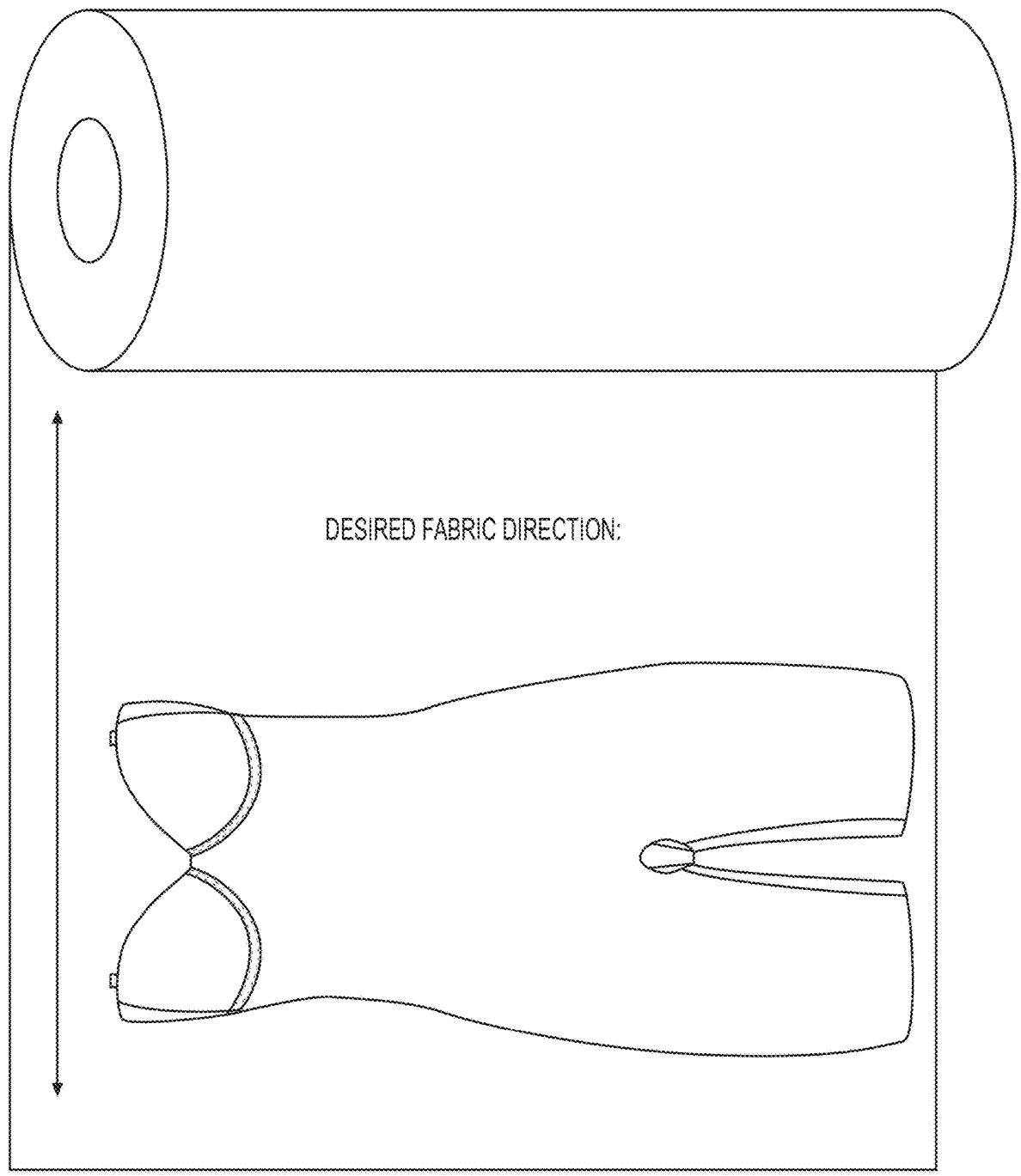
FIG. 16 illustrates the direction that the fabric of the outer component is cut.

The outer component 55 extends downward past the inferior area 51 of the inner component 53 and around to the rear side 33 of the garment 1, forming the abdominal shaping region 37 and the back shaping region 39 of the torso-encircling portion 6. In some embodiments, the outer component 55 is the only layer of fabric in the abdominal and back shaping regions 37, 39. The outer component 55, can, in some embodiments, be a knit material, for example, a warp knit. In some embodiments, the outer component 55 can be a tricot material. In some embodiments, the outer component 55 can be a microfiber material. In some embodiments, the outer component 55 can include nylon and elastane, for example, 49% nylon and 51% elastane. The outer component can, in some embodiments, be about 190 grams per square inch. The fabric of the outer component 55 can be cut as shown in FIG. 16. For example, if the fabric is a knit fabric, the courses can be aligned lengthwise in a superior to inferior direction along the garment 1.

Figure 7:
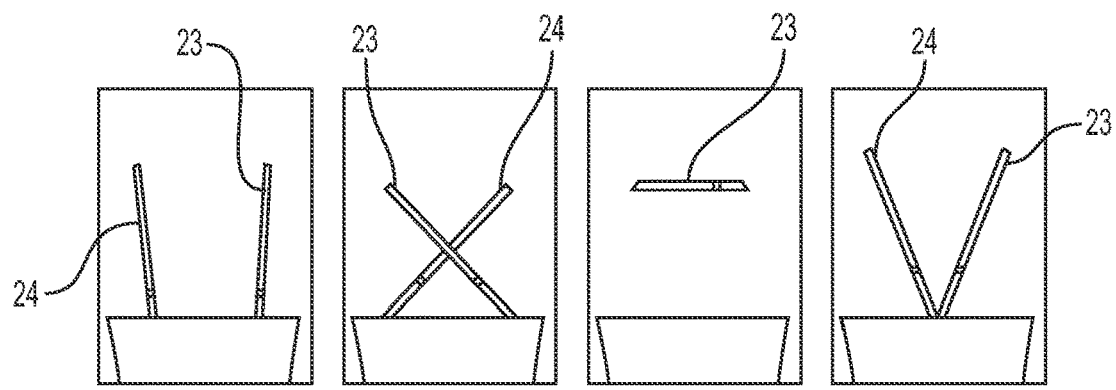
FIG. 7 illustrates various ways that the straps of a garment can be worn.

The garment 1 can also include right and left straps 23, 24, which may be worn in a variety of ways, as shown in FIG. 7, or not at all in the case of a strapless garment. For example, in some embodiments, the straps can be worn five ways (halter, racer back, traditional, criss cross, or strapless). The superior, interior area of the back shaping region 39 can include a number of strap tabs 22 at various intervals along the edge to allow the straps to be worn in these different configurations. In some embodiments, there are a total of six strap tabs 22. Straps 23, 24 can be the same color as the garment, or in some embodiments, the straps 23, 24 can be transparent. The garment 1 and the straps 23, 24 can be supplied to the wearer as a package, along with a strap converter that holds the straps in the center of the back when they are used in the criss cross position.

Figure 8:
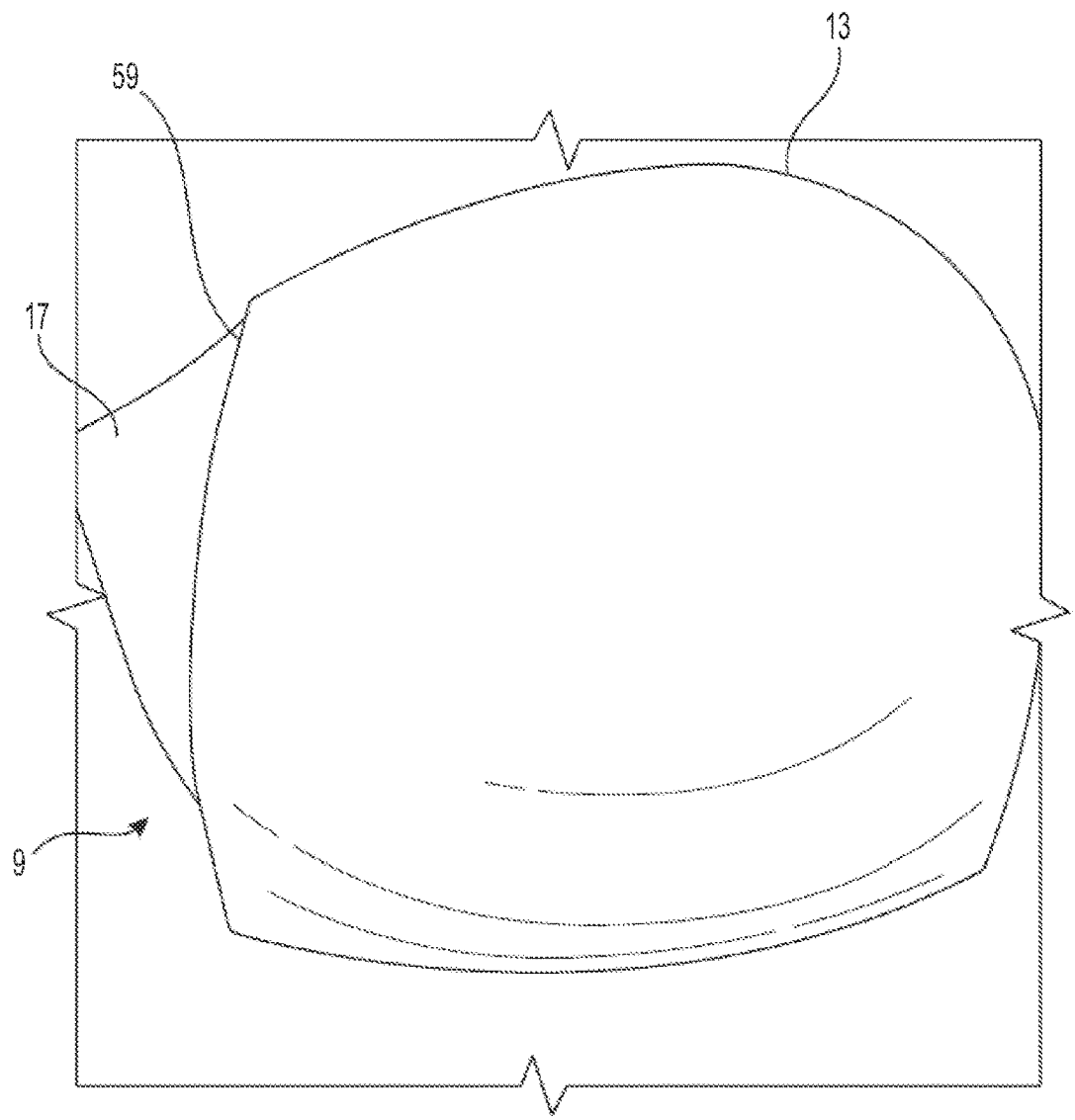
FIG. 8 illustrates the exterior of a brassiere cup of a breast supporting garment.

FIG. 8 shows an exterior view of the right main panel 13 and the right fit-modifying panel 17 of right brassiere cup 9. Fit-modifying panels 15, 17 have a lower elastic modulus than main panels 11, 13, enabling cups 7, 9 to stretch to fit a broader range of breast sizes than possible with conventional construction techniques. For one example embodiment, tension and elongation test ASTM D4964, particularly ASTM D4964 1996 (2008) (tensile testing machine, constant rate of extension), was used to measure mechanical properties. Briefly, a loop specimen of 250 mm in loop length is placed around the clamps of a testing machine. The machine speed is 500 mm/min. The specimen is cycled three times from zero to 100 N load. During the third extension-load cycle, the percent elongation is measured, as is the tension at 30%, 50%, and 70% elongation. Tests were performed on (A) the fabric including the main panel and the fit-modifying panel (attached to each other by sewing), and (B) the fabric used to make the main panel (not including a fit-modifying panel). For the fabric that included both the main panel and the fit modifying panel, the elongation averaged 155%, and the modulus at 50% elongation was 1.48 Newtons. For the fabric that only included the main panel (unattached to a fit-modifying panel), the elongation averaged 127%, and the modulus at 50% elongation was 4.86 Newtons. The inclusion of the fit-modifying panel decreased the elongation under the same load, indicating that the fit-modifying panel has a lower elastic modulus than the main panel. These numbers listed above are for one example embodiment. In other embodiments, the elongation of fabric that includes both a main panel and a fit-modifying panel could range from 100% to 170%, and the modulus at 50% could range from 0.6 Newtons to 1.6 Newtons.

Figure 9:
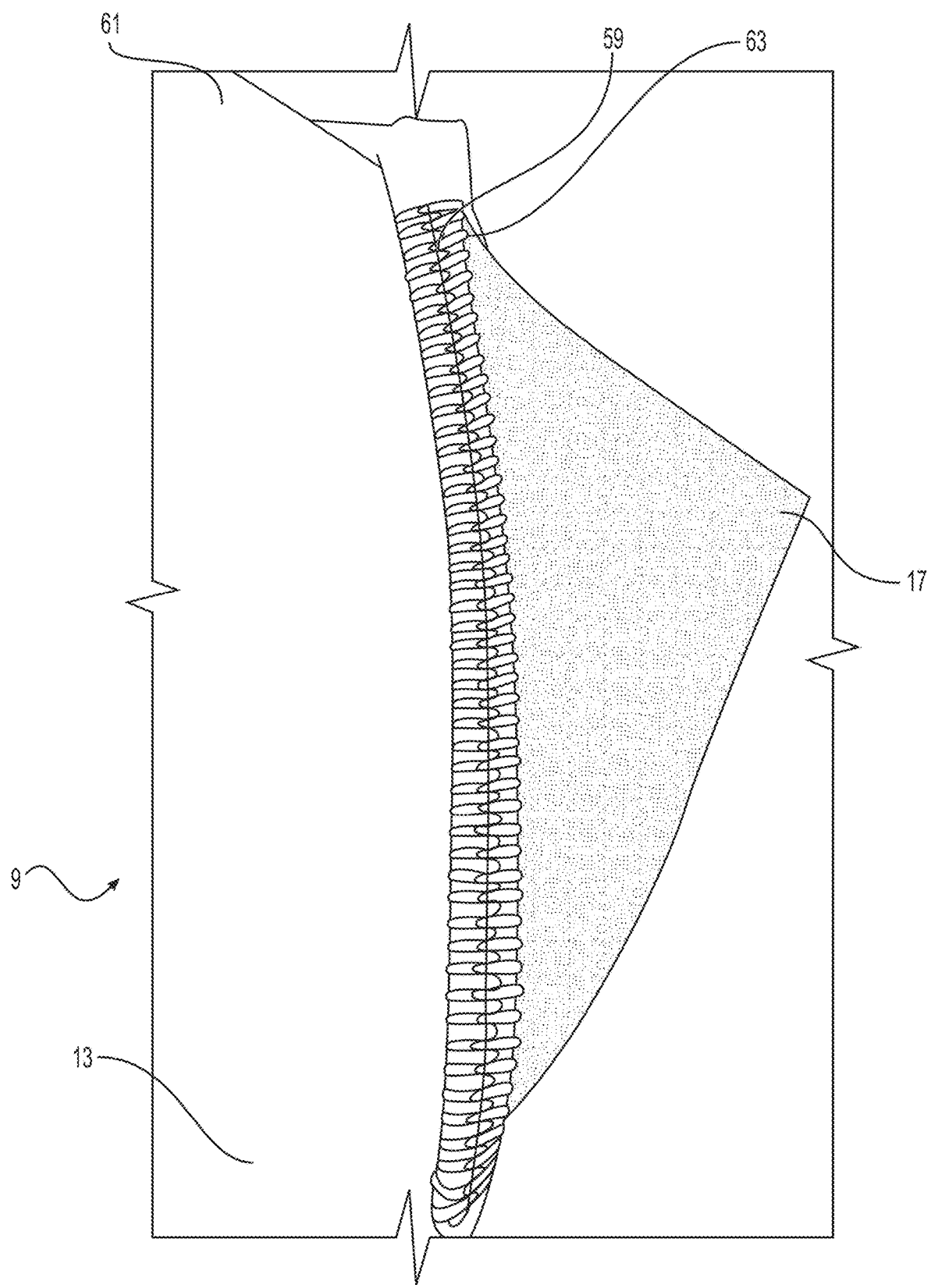
FIG. 9 illustrates an interior view of an attachment between a fit-modifying panel and a main panel of a brassiere cup of a garment.
Figure 10A:
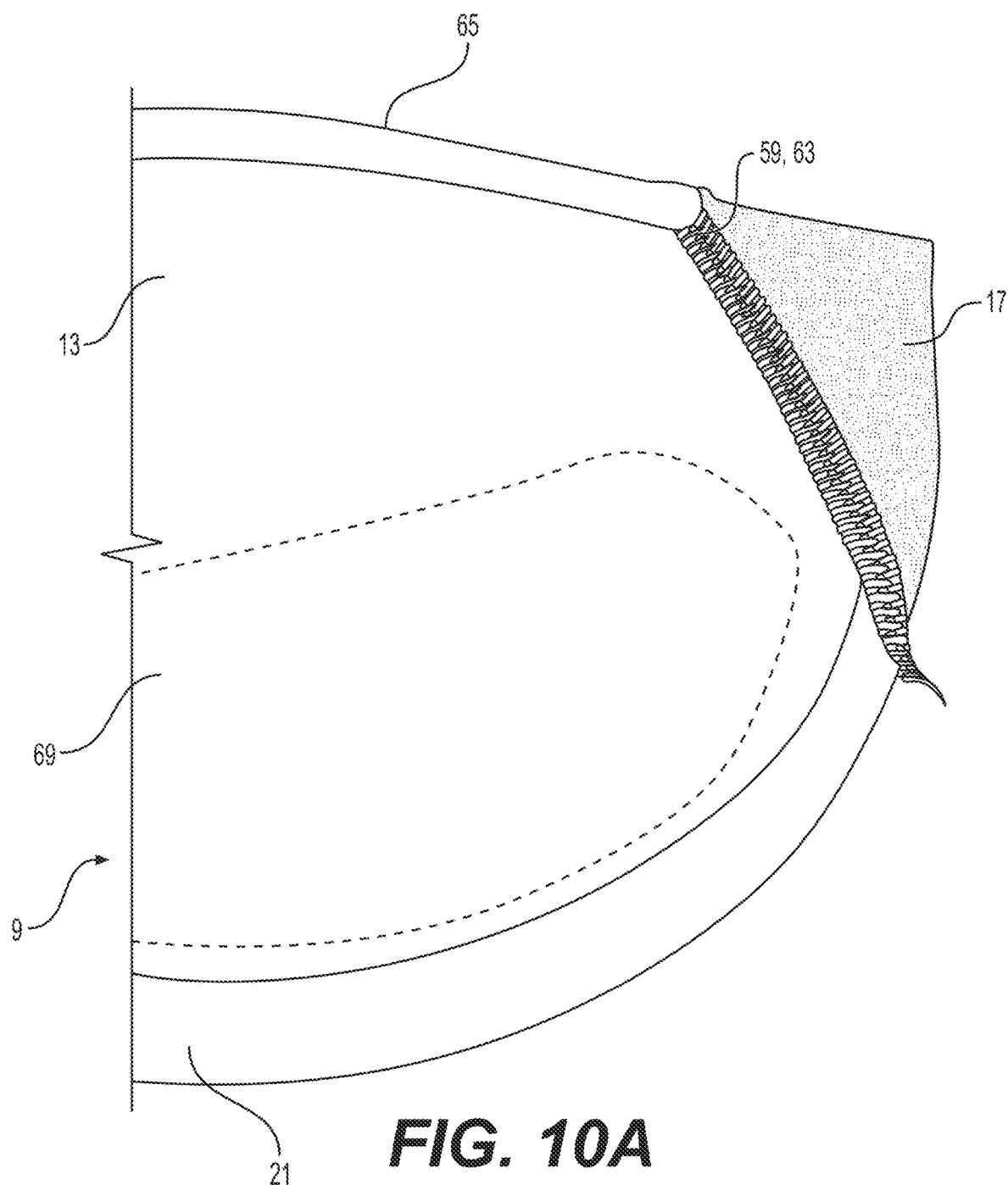
FIG. 10A illustrates an interior view of a folded over superior edge of a brassiere portion with brassiere pads and an attachment between a fit-modifying panel and a main panel of a garment.
Figure 10B:
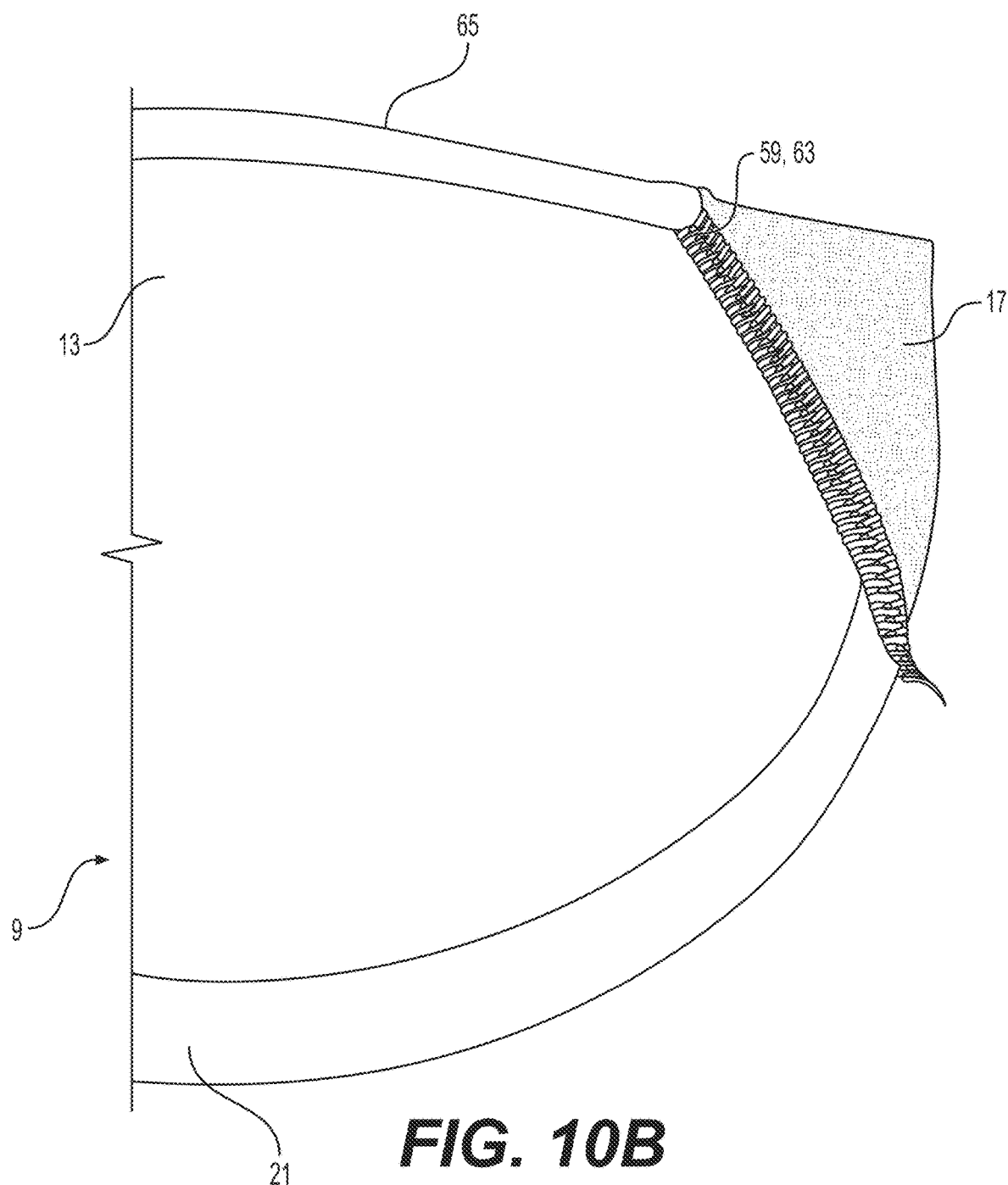
FIG. 10B illustrates an interior view of a folded over superior edge of a brassiere portion without brassiere pads and an attachment between a fit-modifying panel and a main panel of a garment.

The fit-modifying panels extend inferiorly from the superior edge of the bra cup, allowing the bra cup to expand to accommodate a larger breast size. The material of the fit-modifying panel has a high recovery, which also allows for decreases in the wearer's breast size over time. In the embodiments shown, the fit-modifying panels 15, 17 are elongated in the inferior to superior direction and positioned laterally with respect to the main panels. The fit-modifying panels 15, 17 have tapered shapes that narrow as they extend downward toward the bottom edges of the cups 7, 9. However, it is envisioned that the fit-modifying panels could vary in shape, or could be located at different positions relative to the main panel. Some embodiments of the exterior of the brassiere cup 9, such as the one shown in FIG. 8, have a clean, seamless look. The fabric covering the brassiere cup 9 can be, in some embodiments, the same fabric used for outer component 55, to provide a clean overall look to the outside of the garment 1. The seam 63 connecting the fit-modifying panel 17 to the main panel 13 can include a variety of different stitch types. In one embodiment, the seam 63 connecting the fit-modifying panel to the main panel of the cup can include zig-zag stitching, cover stitching, or a combination thereof. The fabric covering the brassiere cup 9 can, in some embodiments, be extended over the exterior surface of the seam 63 between the fit-modifying panel and the main panel. The superior edge 65 of main panel 17 can be folded over and bonded to inner side 61 to enhance the seamless look, as shown in FIG. 10A and FIG. 10B. While FIGS. 8-10 depict the construction of the main panel 17 and fit-modifying panel 13 as it applies to the right cup 9, it should be understood that the left cup 7 can be constructed in a similar manner. FIG. 10A shows a brassiere cup 9 with a brassiere pad 69, whereas FIG. 10B shows a brassiere cup 9 without a brassiere pad. In other embodiments, the fit-modifying panel could be bonded to the main panel, for example, with resins or adhesives. The fit-modifying panel is fixedly attached to the main panel in the embodiments described above, either by sewing or by bonding. However, the cup could also be constructed seamlessly. In a seamless cup embodiment, a main region and a fit-modifying region are constructed of one continuous piece of fabric, with the fit-modifying region seamlessly attached to the main region. The fit-modifying region has a lower elastic modulus than the main region, for example, due to different yarns, stitching patterns, or knit tightness.

Figure 11B:
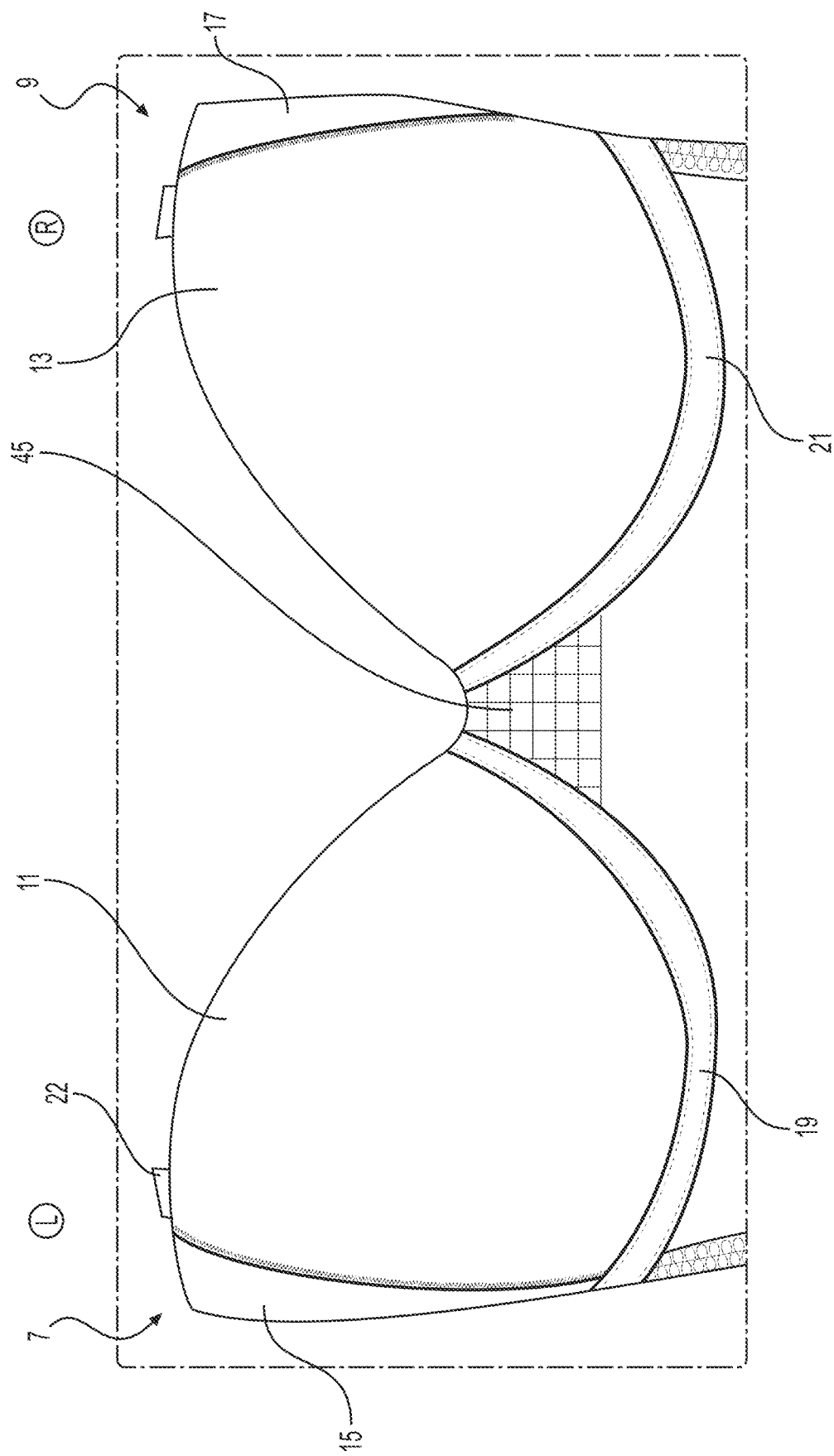
FIG. 11B illustrates an interior view of a brassiere portion with brassiere pads.

FIG. 11A shows the interior of the front side 3 of the brassiere portion 5 of garment 1. The stabilizing panel 45 at the upper, central region of the front side of the garment 1 extends between the left and right underwires 19, 21 and underneath the outer component 55. The stabilizing panel 45 provides additional breast support by limiting movement of the cups relative to each other. The brassiere cups 7, 9 can also include left and right brassiere pads 67, 69. However, certain embodiments of the garment 1 can be made without brassiere pads, as shown in FIG. 11B.

Figure 12:
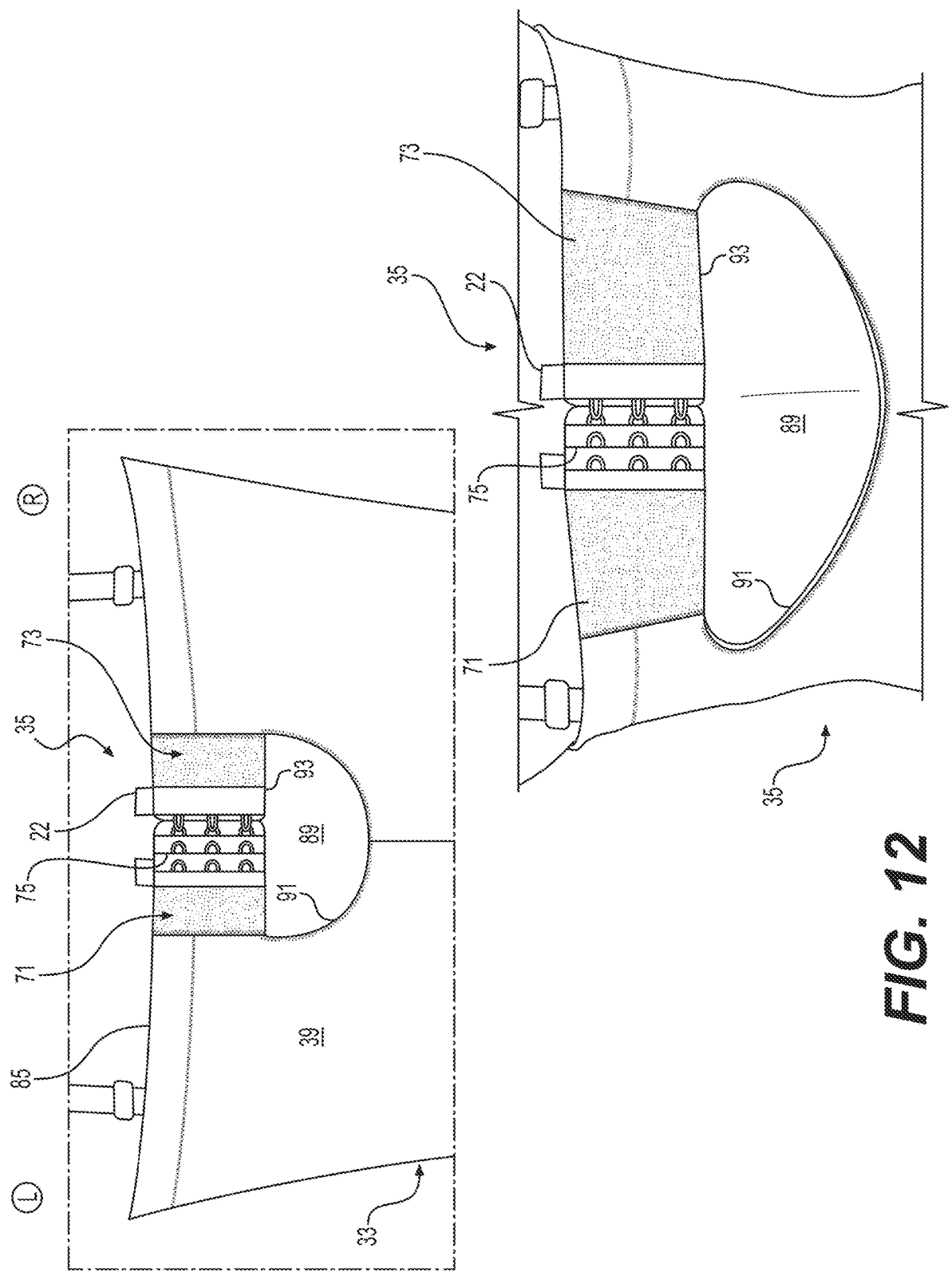
FIG. 12 illustrates a rear view of a garment off a wearer (left side) and on a wearer (right side).

FIG. 12 shows the rear side 33 of the garment 1, both on a wearer (right side) and off a wearer (left side). The back adjuster 35 embodiment shown includes left and right highly elastic regions 71, 73 and a closure mechanism 75 located between the elastic regions. The highly elastic regions 71, 73 can be attached to the closure mechanism 75 by, for example, a zig zag stitch. In other embodiments, the back adjuster 35 could have just one highly elastic region, three highly elastic regions, or more. The highly elastic regions can, in some embodiments, be formed from the same material as the inferior area 51 of the left and right wings 41, 43. The highly elastic regions 71, 73 can be extensions of the inferior areas 51 of the wings 41, 43. Alternatively, the highly elastic regions can separate pieces than the inferior areas 51 of the wing, but stitched directly to the wing. The elastic modulus of the highly elastic regions 71, 73 is lower than the elastic modulus of wings 41, 43 due to the additional structural support granted by the higher-modulus superior area 47 of the wings. The highly elastic regions 71, 73 help to accommodate a large variation in band sizes (i.e. chest diameters as measured around the rib cage, under the breasts).

The back adjuster 35 could include multiple closure mechanisms. The closure mechanism can be, in some embodiments, at least one hook and eye closure 77, as shown in FIG. 13. In the embodiment shown, the eyes are on the outer side of the back adjuster 35, and the hooks curve inward toward the inner side of the back adjuster 35. Other types of closure mechanisms are also possible.

As shown in FIG. 12, the superior edges 85 of the garment 1 extend downward at the back shaping region 39, defining the lateral edges 91 of a space 89 in an upper, central area of the back shaping region 39. Back adjuster 35 bridges the lateral edges 91 of the space 89, defining the superior edge 93 of space 89. The highly elastic regions 71, 73 stretch and the space 89 in the upper, central area of the back shaping region 39 widens to fit the wearer. The space in the embodiment shown is U-shaped, but it is envisioned that the space could be V-shaped or take any other shape that enables the garment to widen in the upper central area of the back shaping region 39. This enables garment 1 to fit a broader range of sizes than is possible using conventional shapewear construction techniques.

Figure 15:
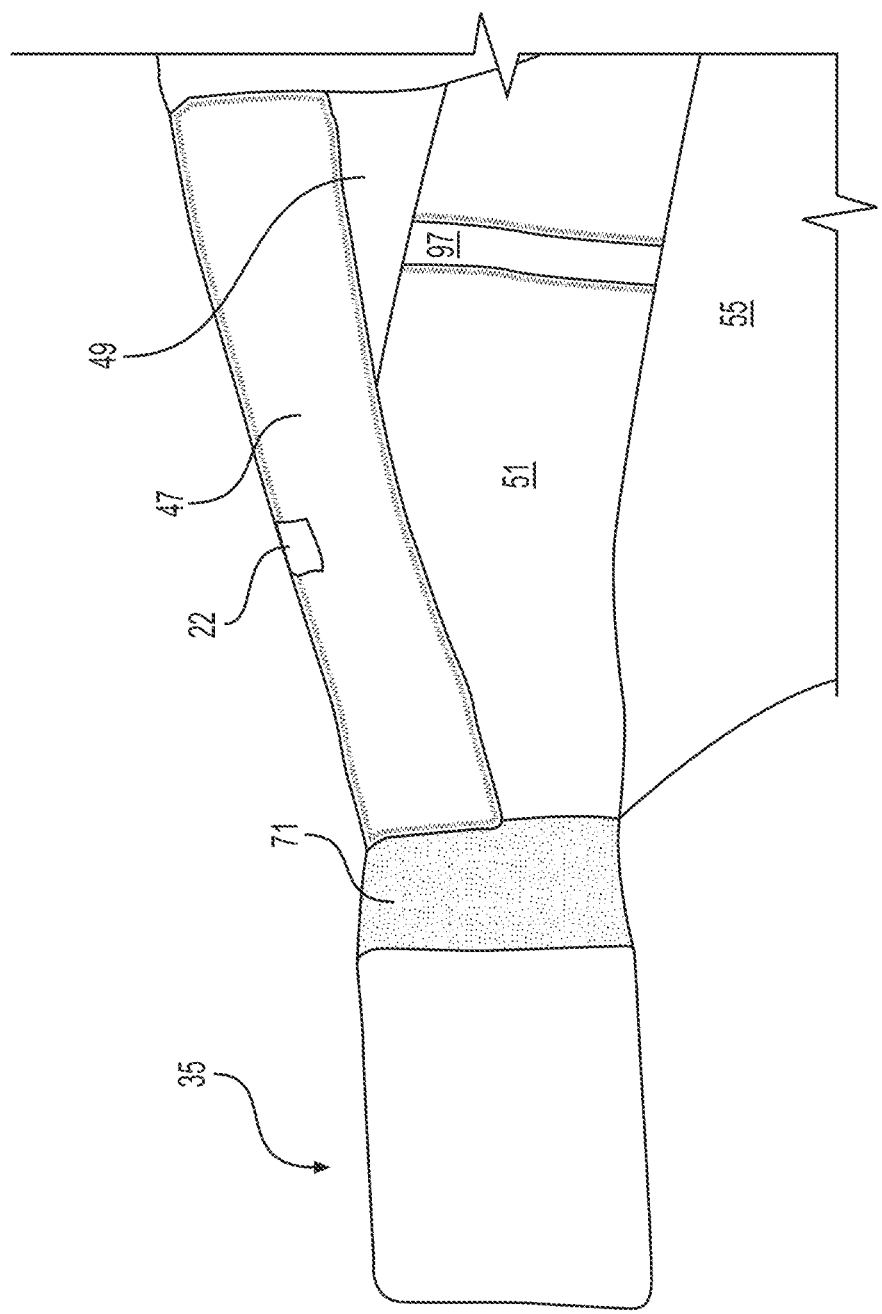
FIG. 15 illustrates an interior view of a left wing.

FIG. 15 shows an interior view of a left wing. The superior area 47 is an elastic band that is attached to the outer component 55 along the superior edge of the garment. The inferior area 51 is a separate elastic band that, in this particular embodiment, is wider than the superior area 47. The middle area 49 extends between and is attached to the superior area 47 and the inferior area 51. In some embodiments, reinforcing rods (i.e., bones) 97 can be provided between the inner component 53 and the outer component 55. The bones can be encased in a casing, and the casing sewn to the garment. They can extend in a superior to inferior direction along part or all of the bra wing.

FIG. 14 shows a schematic for an example method of making the fit-modifying panels 15, 17 using a hot melt technique. Each fit-modifying panel has a first, inner fabric layer 79, a second, outer fabric layer 83, and at least one adhesive layer 81 positioned between the inner and outer fabric layers 79, 83, as shown in FIG. 14. The first, inner fabric layer 79 and the second, outer fabric layer 83 can be formed of the same or of different materials. In some embodiments, the inner and outer fabric layers 79, 83 of the overall fit-modifying fabric 95 (which includes the adhesive layer) are formed of the same material as outer component 55.

Some embodiments of the fit-modifying panels 15, 17 can have a third, central fabric layer (not shown) and two adhesive layers. The first adhesive layer is positioned between the first, inner fabric layer 79 and the third, central fabric layer, and the second adhesive layer is positioned between the second, outer fabric layer 83 and the third, central fabric layer. The third, central fabric layer can be formed of a material with higher elasticity than the first, inner fabric layer or the second, outer fabric layer of the fit-modifying panels 15, 17. For example the third, central fabric layer can be formed of a material that is at least 80% elastane. In some embodiments, the third, central fabric layer can be 83% elastane and 17% nylon Powermesh material that weights 90 grams per square inch. Or, in some embodiments, the third, central layer can be 100% elastane.

Referring again to FIG. 14, the layers of fabric and adhesive are subjected to heat in order to melt the adhesive layers and form fit-modifying fabric 95. In some embodiments the layers of fabric and adhesive can also be subjected to pressure during the melting step. The pressure can be applied using a heat press, as shown in FIG. 14, or can also be applied using a conveyer system. The fit-modifying panels 15, 17 are then cut out of the fit-modifying fabric 95. For embodiments using a third, central layer, the method is adapted as follows: the first and second adhesive layers are adhered to the first, inner layer fabric and to the second, outer layer fabric. The central, third layer is positioned between the first and second adhesive-layer-treated inner and outer layers, with glue dots facing the third, central layer. The layers are bonded using heat and, in some embodiments, pressure. The fit-modifying panel 17 is then cut from the bonded layers of the fit-modifying fabric 95.

Further disclosed herein are methods of making fit-flexible breast supporting garments. Referring to FIG. 9, the methods include attaching a lateral edge 59 of a main panel 13 to the lateral edge a fit-modifying panel 17, for example, by stitching. The stitching can be, for example, a zig-zag stitch, a cover stitch, or a combination of both. In some embodiments, the lateral edge 59 of the main panel is brought into contact with the medial edge of the fit-modifying panel, and a zig-zag stitch is applied over the interface. A cover stitch is then applied over the zig zag stitch at the interface of the fit-modifying panel 17 and the main panel 13, creating seam 63. In some embodiments, a separate fabric is extended over the outer side of the cup 9, including over seam 63. The separate fabric can be bonded to the fit-modifying panel 17 to ensure coverage of the seam 63. The separate fabric can be, for example, the same fabric used to make outer component 55.

The main panel 13 and the fit-modifying panel 17 are attached to an underwire 21, as shown in FIG. 10. Though FIGS. 9-10 show a right cup, it is to be understood that similar methods apply to the left cup of the garment 1. The left and right cups 7, 9 are attached to each other, and a stabilizing panel 45 is also attached between the left and right cups 7, 9, as shown in FIG. 11. The left and right cups 7, 9 are attached to a torso-encircling portion 6, as shown in FIG. 5, and the torso-encircling portion 6 is attached to a back adjuster 35, as shown in FIG. 12. Particularly, in some embodiments, the right wing 43 of the torso-encircling portion 6 is attached to a right highly elastic region 73 of the back adjuster 35, and the left wing 41 attached to the left highly elastic region 71 of the back adjuster 35. In some embodiments, either the left or right highly elastic region 71, 73 is attached to an eye panel, and the other of the left or right highly elastic regions 71, 73 is attached to a hook panel. The hooks curve inward toward an inner side of the back adjuster 35, and the eyes are positioned on the outer side of back adjuster 35. As described above, at least the highly elastic regions 71, 73 the back adjuster 35 have a lower elastic modulus than at least a superior region of the torso-encircling portion 6.

In some embodiments, the wings 41, 43 can be attached to the outer component 55 of the garment 1 as follows. The top edge of the superior area 47 is aligned to the top edge of the outer component 55. The superior area 47 is lapped to the outer component 55 and stitched to both ply with a zig zag stitch. The superior area 47 is then turned to the inside of the garment 1 and the bottom edge of the superior area 47 is stitched to the outer component 55 with a zig zag stitch.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

The invention claimed is:

1. A garment comprising;
a torso-encircling portion comprising:
a left brassiere cup comprising a left underwire,
a right brassiere cup comprising a right underwire,
a left brassiere wing permanently attached to the left brassiere cup,
a right brassiere wing permanently attached to the right brassiere cup, and
an outer component permanently attached to the left and right brassiere wings along a superior edge of the garment,
wherein the torso-encircling portion extends downward and away from the left and right brassiere cups to form an abdominal shaping region on a front side of the garment and a back shaping region on a rear side of the garment,
a back adjuster comprising a left elastic region permanently attached to the left brassiere wing and a right elastic region permanently attached to the right brassiere wing, the left elastic region having a lower elastic modulus than a material of a superior area of the left brassiere wing, and the right elastic region having a lower elastic modulus than a material of a superior area of the right brassiere wing, and
a stabilizing panel connecting the left underwire to the right underwire at an upper, central region of the front side of the garment,
wherein the outer component of the torso-encircling portion attaches to the left underwire and the right underwire over the left and right brassiere wings and the stabilizing panel.

2. The garment of claim 1, wherein the back adjuster comprises at least one closure mechanism.

3. The garment of claim 2, wherein the closure mechanism comprises at least one hook and at least one eye, wherein the eyes are positioned on an outer side of the back adjuster and the hooks curve toward an inner side of the back adjuster.

4. The garment of claim 1, wherein the outer component extends downward across the back shaping region to define lateral edges of a space in an upper, central area of the back shaping region, and wherein the back adjuster bridges the lateral edges of the space.

5. The garment of claim 4, wherein the back adjuster defines the superior edge of the garment in the upper, central area of the back shaping region.

6. The garment of claim 1, further comprising a longitudinal axis extending through the torso-encircling portion in a superior to inferior direction, wherein the left and right brassiere wings are shorter than the outer component in a direction parallel to the longitudinal axis, and wherein inferior areas of the left and right brassiere wings are unattached to the outer component.

7. The garment of claim 1, wherein a lower region of the front side comprises a crotch portion, a lower region of the rear side comprises a buttock shaping portion, and wherein the garment defines right and left leg spaces.

8. The garment of claim 1, further comprising a longitudinal axis extending through the torso-encircling portion in a superior to inferior direction, wherein the left and right brassiere wings are thicker than the outer component in a direction perpendicular to the longitudinal axis.

9. The garment of claim 1, wherein the left brassiere cup further comprises a left main region and a left fit-modifying region attached along a left lateral edge of the left main region, and the right brassiere cup further comprises a right main region and a right fit-modifying region attached along a right lateral edge of the right main region, wherein the left fit-modifying region has a lower elastic modulus than the left main region and the right fit-modifying region has a lower elastic modulus than the right main region.

10. The garment of claim 9, wherein each of the left and right fit-modifying regions has a tapered shape that narrows as it extends downward.

11. The garment of claim 9, wherein each of the left and right fit-modifying regions comprises an inner layer, an outer layer, and at least one layer of adhesive between the inner and outer layers.

12. A garment comprising
a torso-encircling portion extending around a front side and a rear side of the garment, the torso-encircling portion comprising left and right brassiere cups, a left brassiere wing permanently attached to the left brassiere cup, a right brassiere wing permanently attached to the right brassiere cup, and an outer component permanently attached to the left and right brassiere wings along a superior edge of the garment, and
a back adjuster comprising a left elastic region permanently attached to the left brassiere wing and a right elastic region permanently attached to the right brassiere wing, the left elastic region having a lower elastic modulus than a material of a superior area of the left brassiere wing, and the right elastic region having a lower elastic modulus than a material of a superior area of the right brassiere wing,
wherein the left brassiere cup further comprises a left main region and a left fit-modifying region attached along a left lateral edge of the left main region, and the right brassiere cup further comprises a right main region and a right fit-modifying region attached along a right lateral edge of the right main region,
wherein the left fit-modifying region has a lower elastic modulus than the left main region and the right fit-modifying region has a lower elastic modulus than the right main region, and
wherein each of the left and right fit-modifying regions comprises an inner layer, an outer layer, and at least one layer of adhesive between the inner and outer layers.

13. The garment of claim 12, wherein the back adjuster comprises at least one closure mechanism.

14. The garment of claim 13, wherein the closure mechanism comprises at least one hook and at least one eye, wherein the eyes are positioned on an outer side of the back adjuster and the hooks curve toward an inner side of the back adjuster.

15. The garment of claim 12, wherein the outer component extends downward across a back shaping region on a rear side of the garment to define lateral edges of a space in an upper, central area of the back shaping region, and wherein the back adjuster bridges the lateral edges of the space.

16. The garment of claim 15, wherein the back adjuster defines the superior edge of the garment in the upper, central area of the back shaping region.

17. The garment of claim 12, further comprising a longitudinal axis extending through the torso-encircling portion in a superior to inferior direction, wherein the left and right brassiere wings are shorter than the outer component in a direction parallel to the longitudinal axis, and wherein inferior areas of the left and right brassiere wings are unattached to the outer component.

18. The garment of claim 12, wherein each of the left and right fit-modifying regions has a tapered shape that narrows as each of the left and right fit-modifying regions extends downward.

19. The garment of claim 12, wherein the left fit-modifying region is attached to the left main region and the right fit-modifying region is attached to the right main region.

20. The garment of claim 12, wherein each of the left and right fit-modifying regions comprises a central layer positioned between the inner and outer layers and having a lower elastic modulus than the inner or outer layers.

21. The garment of claim 12, further comprising a first layer of adhesive between the inner layer and the central layer and a second layer of adhesive between the central layer and the outer layer.

22. A method of making a fit-flexible breast-supporting garment, the method comprising
forming a left brassiere cup by attaching a left lateral edge of a left main panel to a left fit-modifying panel having a lower elastic modulus than the left main panel, and attaching the left main panel and the left fit-modifying panel to a left underwire,
forming a right brassiere cup by attaching a right lateral edge of a right main panel to a right fit-modifying panel having a lower elastic modulus than the right main panel, and attaching the right main panel and the right fit-modifying panel to a right underwire,
attaching the right brassiere cup to the left brassiere cup,
permanently attaching the left brassiere cup to a left brassiere wing,
permanently attaching the right brassiere cup to a right brassiere wing,
permanently attaching an outer component to superior areas of the left and right brassiere wings at a superior edge of the garment,
permanently attaching the left brassiere wing to a left elastic region of a back adjuster, and
permanently attaching the right brassiere wing to a right elastic region of the back adjuster,
wherein a material of the left and right elastic regions has a lower elastic modulus than a material of the superior areas of the left and right brassiere wings.

23. The method of claim 22 further comprising forming the left and right fit-modifying panels prior to attaching the left and right fit-modifying panels to the left and right main panels, wherein forming the left and right fit-modifying panels comprises
positioning at least one adhesive layer between a first fabric layer and a second fabric layer,
melting the adhesive layer between the first and second fabric layers to form a fit-modifying fabric, and
cutting the fit-modifying fabric to form the left and right fit-modifying panels.

24. The method of claim 23, wherein attaching the left main panel to the left fit-modifying panel further comprises stitching the left-fit modifying panel to the inner side of the left lateral edge using a zig zag stitch and a coverstitch, and wherein attaching the right main panel to the right fit-modifying panel further comprises stitching the right-fit modifying panel to the inner side of the right lateral edge using a zig zag stitch and a coverstitch.

25. The method of claim 23, further comprising
positioning a third fabric layer between the first and second fabric layers, the third fabric layer comprising at least 80% elastane,
positioning a first adhesive layer between the first and third fabric layers,
positioning a second adhesive layer between the second and third fabric layers,
melting the first and second adhesive layers between the first, second and third fabric layers to form the fit-modifying fabric, and
cutting the fit-modifying fabric to form the left fit-modifying panel and the right fit-modifying panel.

* * * * *